United States Patent [19]
Carevic et al.

[11] 4,011,196
[45] Mar. 8, 1977

[54] STABILIZED POLYESTER RESIN AND PROCESSES FOR MAKING THEM

[75] Inventors: Frank E. Carevic, West Chester, Pa.; Anthony Labriola, Pennsville, N.J.

[73] Assignee: FMC Corporation, Philadelphia, Pa.

[22] Filed: Nov. 16, 1972

[21] Appl. No.: 307,017

Related U.S. Application Data

[63] Continuation-in-part of Ser. No. 173,284, Aug. 19, 1971, abandoned.

[52] U.S. Cl. .............. 260/45.85 B; 260/45.95 H; 260/45.95 G; 260/45.7 PH
[51] Int. Cl.² .................. C08K 5/52; C08K 5/13; C08K 5/12
[58] Field of Search ............. 260/45.95 H, 45.85, 260/75, 45.95 G, 45.7 PH

[56] References Cited

UNITED STATES PATENTS

| | | | |
|---|---|---|---|
| 2,437,232 | 3/1948 | Rothrock et al. | 260/75 |
| 3,085,003 | 4/1963 | Morris | 260/45.95 |
| 3,285,855 | 11/1966 | Dexter et al. | 260/45.85 |
| 3,305,484 | 2/1967 | Orloff | 260/45.85 |
| 3,361,846 | 1/1968 | Gleim et al. | 260/860 |
| 3,445,504 | 5/1969 | Mehalso | 260/75 |
| 3,563,949 | 2/1971 | Haebeck et al. | 260/45.95 |

OTHER PUBLICATIONS

Journal of Polymer Science – vol. 54 (1961) pp. 385, 388, 389.

Primary Examiner—V. P. Hoke
Attorney, Agent, or Firm—Eugene G. Horsky; Pauline Newman; Eugene G. Seems

[57] ABSTRACT

Process of making a polyester resin using a zinc esterification catalyst and a hindered phenol stabilizer.

4 Claims, No Drawings

STABILIZED POLYESTER RESIN AND PROCESSES FOR MAKING THEM

This application is a continuation-in-part of copending application, Ser. No. 173,284 filed Aug. 19, 1971 now abandoned.

This invention relates to a process for making film and fiber-forming polyester resins having improved resistance to deterioration by heat and moisture. More particularly, this invention relates to processes for making improved stabilized fiber and film-forming polyethylene terephthalate polyester resins having greater resistance to deterioration by heat and moisture and in which a zinc esterification catalyst is used, the heat stabilizer or antioxidant is a hindered phenol that is added to the monomers before they are reacted or to the reaction product or partial polymerization product thereof any time before the completion of the desired polyester polymer.

Polyester resins in general are subject to deterioration by heat and moisture. Some deterioration takes place when the polyester resin is melted and extruded in the form of a filament or a film. Such deterioration reduces the intrinsic viscosity of the resin (I.V.). This has a marked effect on products made of the resin. It causes the product to become brittle and lowers its voltage resistance or dielectric strength.

It is an object of this invention to provide a fiber-forming or film-forming polyethylene terephthalate polyester resin having improved resistance to deterioration by moisture and heat.

Another object of the invention is to provide processes for making fiber and film-forming polyethylene terephthalate polyester resins using a zinc esterification catalyst and a hindered phenol antioxidant or stabilizer that has or forms a reactive side chain or group that is capable of reacting with the polyester polymer chain.

Other objects and advantages of the invention will be apparent from the following description and the appended claims.

In accordance with this invention a hindered phenol antioxidant or stabilizer in a small or stabilizing amount is added to the polyester resin-forming reactant mixture during either the first stage esterification or trans-esterification stage during which a zinc catalyst is used or thereafter during the second stage condensation or copolymerizing stage any time shortly before the desired intrinsic viscosity (I.V.) of the polymer is reached. An acceptable I.V. for filaments may be 0.6 and for film it may be 0.7. This is determined in the customary manner by extrapolation using as a solvent 60% phenol and 40% tetrachloroethane by weight at 30° C.

All hindered phenols employed in this invention have one lower alkyl group in the ortho position relative to the hydroxyl on the aromatic ring and another lower alkyl group in the other ortho position or in the other meta position relative to the hydroxyl group and in the para position relative to the first lower alkyl group. The lower alkyl groups are either isopropyl, tertiary butyl, or neopentyl. The two lower alkyl groups attached to the aromatic ring may be the same or they may be different. The di-lower alkyl phenol also has a carboxyl, hydroxyalkyl or carboalkoxy side group or side chain or other group or side chain that will form a carboxyl, hydroxyalkyl or carboalkoxy side group or side chain under reaction conditions used in making polyester resin which side group or side chain is capable of reacting or polymerizing with the polyester polymer chains.

It is found in accordance with this invention that the addition of the hindered phenol before the completion of the desired degree of polymerization results in a polyester resin having improved resistance to deterioration to heat and moisture over a polyester resin to which the hindered phenol is added to the resin itself after the desired degree of polymerization had been reached.

While it has not been established, it is believed that the hindered phenol that is added to or that is formed under the conditions present during esterification and polymerization of the polyester resin at least to some extent reacts with and becomes a part of the polyester chains.

The hindered phenols that may be used as represented by the following formulae: In each of these the dialkyl hydroxy phenyl group may be represented by the formula:

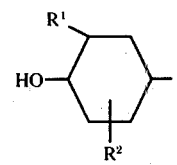

$R^1$ is in the 3 position or with respect to the hydroxyl is in the ortho position. $R^2$ may be in either the 5 or 6 position or with respect to the hydroxyl may be in the other ortho position or meta position. $R^1$ and $R^2$ are each lower alkyl groups and may be isopropyl, tertiary butyl, or neopentyl. Any other alkyl or polymethylene group having 3 or more carbon atoms of the suitable compounds may be either straight or branched chain.

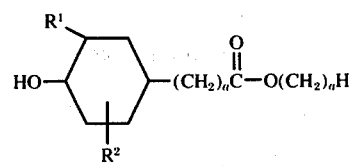

a has a value of zero to 18, inclusive

Specific compounds of the above class are:
methyl (3',5' di-isopropyl-4' hydroxy) benzoate
ethyl (3',6' di-tertiary butyl 4' hydroxy phenyl) acetate
propyl 3-(3',5' di-neopentyl- 4' hydroxy phenyl) propionate

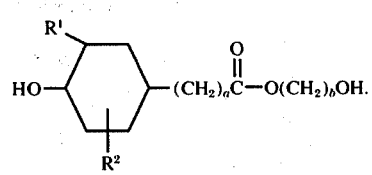

a has a value of zero to 18, inclusive
b has a value of 2 to 8, inclusive

Specific examples of this class are:
Hydroxyethyl (3',5' di-isopropyl 4' hydroxy) benzoate.
Hydroxypropyl (3',5' di-tertiary butyl 4' hydroxy phenyl) acetate.

Hydroxybutyl 3-(3',5' di-tertiary butyl 4' hydroxy phenol) propionate.

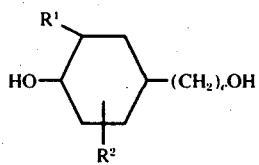

c has a value of 1 to 18, inclusive.

Specific examples of this class are:
(3',5' di-tertiary butyl 4' hydroxy phenyl) methanol.
3-(3',5' di-tertiary butyl 4' hydroxy phenyl) propanol.
4-(3',5' di-tertiary butyl 4' hydroxy phenyl) butanol.

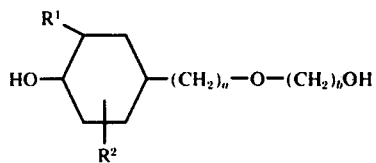

b has a value of 2 to 8, inclusive
a has a value of zero to 18, inclusive

Specific examples of this class are:
(3',5' di-tertiary butyl 4' hydroxy phenyl) ethylene glycolate.
(3',5' di-tertiary butyl 4' hydroxy phenyl) propylene glycolate.
(3',5' di-tertiary butyl 4' hydroxy phenyl) butylene glycolate.
(3',5' di-tertiary butyl 4' hydroxy phenyl ethyl)ethylene glycolate.

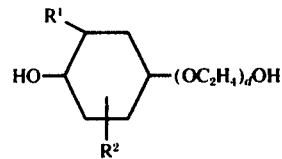

d has a value of 1 to 10, inclusive

Specific examples of this class are:
(3',5' di-tertiary butyl 4' hydroxy phenoxy) ethanol
(3',5' di-tertiary butyl 4' hydroxy phenoxy) ethoxy ethanol
(3',5' di-tertiary butyl 4' hydroxy phenoxy) diethoxy ethanol.

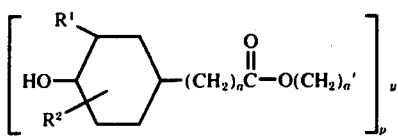

a has a value of zero to 18 inclusive
a' has a value of zero to 18 inclusive
p is either 2 or 4
y may be $(CH_2)_K$
K has a value of 1 to 8, inclusive
y may be C
y may be $O(CH_2CH_2O)_e$
e has a value of 1 to 10, inclusive.

Specific examples of this class are:

di-ethylene glycol ester of 3-(3',5' di-tertiary butyl 4' hydroxy phenyl) propionic acid
bis(3',5' di-tertiary butyl 4' hydroxy phenol) ethylene glycolate.
[3-(3',5' di-tertiary butyl 4'-hydroxy phenyl) propionate] methane.
tetrakis [methylene 3-(3',5' di-tertiary butyl-4' hydroxy phenyl) propionate] methane Compounds set forth above and similar compounds and methods of making them are set forth in U.S. Pat. No. 3,330,859 which issued July 11, 1967.

In the practice of the invention the amount of the antioxidant stabilizer that is added may be from 0.02 up to 2.0 mol percent and preferably from 0.04 to 0.4 mol percent. This mole percentage is based on one mol of the ester of dimethyl terephthalate and one mol of ethylene glycol, or methyl hydroxy ethyl terephthalate.

The esterification or transesterification step is carried out using a zinc organic acid salt such as zinc acetate, zinc propionate, zinc butyrate, or zinc benzoate as the catalyst. This catalyst remains in the reaction mixture and is present during the polymerization step.

In addition to the hindered phenol antioxidant or stabilizer, a phosphorus acid or ester, namely, a triaryl or trialkyl phosphite, or phosphate, phosphoric acid or phosphorous acid stabilizer is also employed during the polymerization step.

The following example is illustrative of the method of practicing the invention:

EXAMPLE I

The following compounds and in the amounts by weight indicated are mixed together in a reaction vessel:

100 lbs. dimethyl terephthalate
67 lbs. ethylene glycol 13.6 grams of zinc acetate dihydrate

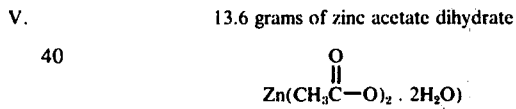

The reaction mixture is heated from room temperature up to 400° ±5° F. and methanol is distilled off. Then 13.6 grams of antimony trioxide ($Sb_2O_3$) is added as a condensation or polymerization catalyst and 19.6 grams of tri-phenyl phosphite as a melt stabilizer is also added. At this point 90.8 grams of octadecyl 3(3',5'-di-tertiary butyl 4' hydroxy phenyl) propionate is added.

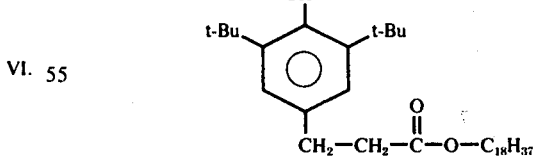

The reaction mixture is then heated up to 500° F. at atmospheric pressure. Excess ethylene glycol is removed and when the mixture reaches 510° F. a vacuum is applied and the pressure is gradually reduced over a 40 minute period to a pressure of 1.5 millimeters of mercury. The remaining ethylene glycol is removed under maximum vacuum, that is, a pressure of 0.5 to 0.7 millimeters of mercury and the temperature is increased up to 540°–550° F. The composition is held at this temperature and this pressure until the condensation or polymerization is carried out to such an extent that the intrinsic viscosity reaches the desired amount. The intrinsic viscosity of polyester resin for fiber may be 0.6 and for film may be 0.7.

The other hindered phenol antioxidant stabilizers disclosed above are used in making the polyester resin in the same way, as in Example I, using the same proportions of monomers and catalysts and with the same operating conditions.

Films were prepared by extruding the resins in amorphous form. The films were then stretched longitudinally, then transversely to substantially the same extent; namely, about 3 times the original dimensions in both directions, then heat-set at about 200° C. while held under tension to restrict dimensional change. The thickness of the resulting biaxially stretched films was of the order of 0.8 to 1.0 mil.

Melt stabilizers other than the tri-phenyl phosphite set forth in Example I may also be used. A stabilizing amount of the melt stabilizer of the order of 0.008 to 0.2 weight percent based on either the weight of the dimethyl terephthalate or terephthalic acid that is used is added after the first stage esterification or transesterification has been completed and before the beginning of the second stage condensation or polymerization stage. The other melt stabilizers that may be used include other phosphite, phosphate, phosphoric and phosphorus acids and includes the following other compounds:
triethyl phosphate
triethyl phosphite
tris (p-dodecylphenyl) phosphite
tris (p-tertiary butyl phenyl) phosphite
tricresyl phosphite
triphenyl phosphate
phosphoric acid
phosphorous acid Further examples, II, III, IV, V, and VI, of polyester resins of this invention and methods of making them are shown in the following Table I. Examples VII and VIII are of polyester resins made without the hindered phenol antioxidant or stabilizer and are shown for comparison with films embodying the invention set forth in the further data below.

As shown in the Tables II, III, IV and V below, the films made of polyester resin containing the hindered phenol stabilizer added to the polyester resin before the completion of polymerization have improved resistance to deterioration by heat and moisture over films not containing the hindered phenol and films made of polyester resin to which a hindered phenol is added after the resin has reached its desired state or degree of polymerization and is present as such in the resin. The resin referred to by lot numbers are the same as those referred to in Table I.

TABLE II

HEAT TREATMENT OF RESTRAINED POLYESTER FILMS

CONDITIONS: AIR CIRCULATING OVEN
240° C.      30 MINUTES

The Air had a relative humidity of 45% at 70° F.

| Lot No. | Orig. Film I.V. | Final Film I.V. |
|---------|-----------------|-----------------|
| 150 | 0.702 | 0.569 |
| 162 | 0.637 | 0.596 |
| 163 | 0.651 | 0.837 |
| 167 | 0.648 | 0.952 |
| 171 | 0.616 | 0.884 |
| 179 | 0.640 | 0.657 |

The hindered phenol of Example I is added to a batch of the polyester resin pellets after the polyester resin has been polymerized as in Example I, and the hindered phenol is present as such as a coating on the polyester resin pellets. The amount of the hindered phenol that is added to the resin pellets is 0.2% by weight based on the weight of the resin pellets.

| Orig. Film I.V. | Final Film I.V. |
|-----------------|-----------------|
| 0.641 | 0.628 |

TABLE I

| Example No. | Polymer Lot No. | Catalyst Composition and Quantity | Phosphorous Additive and Quantity | | Antioxidant and Quantity |
|---|---|---|---|---|---|
| VII | 150 | 0.03 Zn (Ac)$_2$ .2H$_2$O 0.03 Sb$_2$O$_3$ | (C$_6$H$_5$O)$_3$P | 0.0432 | NONE |
| VIII | 162 | " " | H$_3$PO$_3$ | 0.0141 | NONE |
| II | 163 | " " | (C$_6$H$_5$O)$_3$ P | 0.0432 | 0.01 octadecyl 3-(3',5'- di-t-butyl-4'-hydroxyphenyl) propionate |
| I | 167 | " " | " | " | 0.02 octadecyl 3-(3',5'- di-t-butyl-4'-hydroxyphenyl) propionate |
| III | 171 | " " | H$_3$PO$_3$ | 0.0141 | 0.02 octadecyl 3-(3',5'- di-t-butyl-4'-hydroxyphenyl) propionate |
| IV | 179 | " " | NONE | | 0.02 octadecyl 3-(3',5'- di-t-butyl-4'-hydroxyphenyl) propionate |
| V | 180 | " " | (C$_6$H$_5$O)$_3$P | 0.0432 | 0.05 octadecyl 3-(3',5'- di-t-butyl-4'-hydroxyphenyl) propionate |
| VI | 183 | " " | " | " | 0.02 tetrakis [methylene 3-(3'-5'-di-t-butyl-4'-hydroxyphenyl) propionate] methane |

TABLE III

HEAT TREATMENT OF RESTRAINED POLYESTER FILMS

CONDITIONS: MOIST AIR
240° C.     30 MINUTES

The air had a relative humidity of 100%
at 70° F.

| Lot No. | Orig. Film I.V. | Final Film I.V. |
|---|---|---|
| 150 | 0.702 | 0.483 |
| 167 | 0.648 | 1.010 |

TABLE IV

HEAT TREATMENT OF POLYESTER RESIN

CONDITIONS: RESIN CUBES ⅛" × ⅛"
AIR CIRCULATING OVEN
220° C.       24 HOURS

The air had a relative humidity of 45%
at room temperature of 70° F.

| Lot No. | Orig. I.V. | Carboxyl End Groups (Eq/10⁶g) | Final I.V. | Carboxyl End Groups (Eq/10⁶g) |
|---|---|---|---|---|
| 150 | 0.717 | 20 | .525 | 105 |
| 162 | 0.653 | 19 | .537 | 90 |
| 163 | 0.654 | 22 | .720 | 32 |
| 167 | 0.637 | 16 | .718 | 32 |
| 171 | 0.641 | 15 | .717 | 28 |
| 179 | 0.658 | 46 | .496 | 117 |
| 183 | 0.637 | 13 | .680 | 33 |

TABLE V

VOLTAGE BREAKDOWN TESTS ON HEAT AGED FILMS:

CONDITIONS: AIR CIRCULATING OVEN 230° C.

Films heated in aluminum foil sandwiched in rigid frame.

Voltage Breakdown Strength kv/mil.
Avg. 2 samples each test.

The air had a relative humidity of 45% at room
temperature of 70° F.

| Heating Time (Hrs.) | Lot 167 | Lot 150 |
|---|---|---|
| 0 | 6.1 | 7.4 |
| 2 | 5.4 | 3.3 |
| 4 | 6.1 | Film Disintegrated |
| 6.5 | 5.7 | Film Disintegrated |
| 16 | 4.9 | Film Disintegrated |

TABLE VI

Effect of Transesterification Catalyst
and Antioxidant on Brittleness of
Polyester Films

| Polymer Lot No. | Catalyst Composition and Quantity | Antioxidant & Quantity | Film Condition after heat aging for 4 hours at 210° C. |
|---|---|---|---|
| 150 | .03 Zn(Ac)₂ .2H₂O<br>.03 Sb₂O₃<br>.0432 (C₆H₅O)₃P | None | Very Brittle |
| 167 | " | 0.2A | Flexible (took 7 hours to reach brittle state) |
| 183 | " | 0.2B | Flexible |
| 203 | .028 Mₙ(Ac)₂<br>.03 Sb₂O₃<br>.0432 (C₆H₅O)₃P | 0.2B | Brittle |

Antioxidant A: Octadecyl 3-(3',5'-di-t-butyl-4'-hydroxyphenyl) propionate

Antioxidant B: Tetrakis [methylene 3-(3',5'-di-t-butyl-4'-hydroxyphenyl) propionate] methane The amounts of the catalysts, additives and antioxidants are given in the table as weight percent based on the weight of dimethyl terephthalate used in the reaction.

It has been found and is shown in Table VI that the transesterification catalyst has a profound effect on the effectiveness of the claimed phenolic antioxidants toward heat embrittlement of polyester film.

The polymer lots set forth in Table VI were polymerized and converted into film by the esterification and polymerization methods set forth in Example I using the triphenyl phosphite stabilizer.

Films of the resin were sandwiched between aluminum foil and were restrained in 12 + 12 inch aluminum frames, then heat aged for 4 hours in a forced draft oven maintained at 210° C. The sandwiching of the films between aluminum foil hastens the degradation process. After removal from the oven, the films were cooled and removed from the frames. When tested for brittleness by vigorous hand flexing, the films listed as "brittle" in the chart developed many cracks and broke away during flexing. Films described as "flexible", did not develop cracks during the same degree of flexing and retained their integrity. It is to be particularly noted that films from lot 203 in which the manganese acetate transesterification catalyst was used was brittle after heat aging.

As shown from the chart the catalyst used has a material effect on the polymer that is formed and the zinc catalyst produces a polymer that is less brittle.

While preferred embodiments of this invention have been made and described changes and variations may be made without departing from the spirit of the invention as defined in the appended claims:

We claim:

1. A process for producing a fiber or film-forming polyester having improved resistance to deterioration by heat and moisture comprising polycondensing bis 2-hydroxy ethyl terephthalate formed by transesterification, or intermediate condensation products thereof, in the presence of a zinc organic acid salt transesterification catalyst, a phosphorus acid or ester thereof, and a stabilizing amount of a hindered phenol represented by the formula:

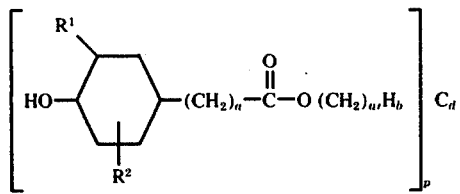

in which $R^1$ and $R^2$ are lower alkyls of the group consisting of isopropyl, tertiary butyl and neopentyl, with $R^1$ in a position ortho to the hydroxyl group and $R^2$ in the other position ortho to the hydroxyl group or in the other position meta to the hydroxyl group and para to $R^1$ and in which $a$ and $a'$ each has a value of from 0 to 18 inclusive, $b$ has a value of 0 or 1, $d$ has a value of 0 or 1 and $p$ has a value of 1 or 4, and in which when $p$ has a value of 1, $b$ has a value of 1 and $d$ has a value of 0, and when $p$ has a value of 4, $b$ has a value of 0 and $d$ has a value of 1.

2. The process of claim 1 wherein the hindered phenol is represented by the formula:

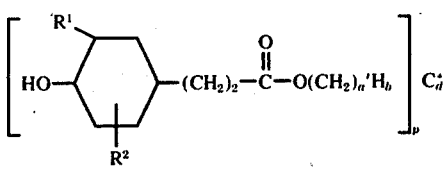

in which $R^1$ and $R^2$ are each tertiary butyl, $a'$ has a value of either 1 or 18, and in which when $a'$ has a value of 1, $p$ has a value of 4; and in which when $a'$ has a value of 18, $p$ has a value of 1.

3. The process of claim 1 wherein the hindered phenol is:

octadecyl-3-(3′,5′-di-tertiary butyl-4′ hydroxy-phenyl) propionate

4. The process of claim 1 wherein the hindered phenol is:

tetrakis [methylene 3-(3′,5′-di-tertiary butyl-4′-hydroxy-phenyl) propionate] methane

* * * * *

UNITED STATES PATENT OFFICE
CERTIFICATE OF CORRECTION

PATENT NO. : 4,011,196
DATED : March 8, 1977
INVENTOR(S) : Frank E. Carevic and Anthony Labriola It is certified that error appears in the above-identified patent and that said Letters Patent are hereby corrected as shown below:

Column 1, line 5, "1971" should read --1971,--. Column 2, line 18, "as" should read --are--. Table I, --The amounts of the catalysts, additives and antioxidants are given in the table as weight percent based on the weight of the dimethyl terephthalate used in this reaction.-- should follow thereafter. Column 8, line 14, "12 + 12" should read --12" x 12"--. Column 10, line 24, "hydroxy-phenyl)" should read --hydroxyphenyl)--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks